US009705357B2

(12) United States Patent
Apalenek et al.

(10) Patent No.: US 9,705,357 B2
(45) Date of Patent: *Jul. 11, 2017

(54) HYBRID ELECTRIC GENERATOR SET

(71) Applicant: BAE Systems Controls Inc., Endicott, NY (US)

(72) Inventors: Thomas Apalenek, Rancho Cucamonga, CA (US); Gordon Lu, Vestal, NY (US); Stephen Pasterski, Castle Creek, NY (US); Thomas Quigley, Newark Valley, NY (US)

(73) Assignee: BAE Systems Controls Inc., Endicott, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/671,291

(22) Filed: Mar. 27, 2015

(65) Prior Publication Data
US 2015/0200564 A1 Jul. 16, 2015

Related U.S. Application Data

(63) Continuation of application No. 13/206,083, filed on Aug. 9, 2011, now Pat. No. 8,994,214.

(51) Int. Cl.
H02J 7/35 (2006.01)
H02J 7/34 (2006.01)
(Continued)

(52) U.S. Cl.
CPC ........ H02J 7/34 (2013.01); H02J 4/00 (2013.01); H02J 7/35 (2013.01); H02J 9/062 (2013.01);
(Continued)

(58) Field of Classification Search
CPC ....... H02J 9/00; H02J 7/35; H02J 9/08; Y10T 307/615; Y02B 10/72
(Continued)

(56) References Cited

U.S. PATENT DOCUMENTS 4,097,305 A 6/1978 Chiesa, Jr. et al.
5,532,525 A 7/1996 Kaiser
(Continued)

FOREIGN PATENT DOCUMENTS

EP 1 306 958 A2 5/2003
EP 1 810 861 A1 7/2007
(Continued)

OTHER PUBLICATIONS

Australian Patent Examination Report No. 1 dated Apr. 1, 2014 received in related application AU 2012203536.
(Continued)

Primary Examiner — Robert Deberadinis
(74) Attorney, Agent, or Firm — Scully Scott Murphy & Presser PC; Scott J. Asmus

(57) ABSTRACT

A portable generator system provides power to a load source including an engine and a generator. The engine drives the generator to provide a generator alternating current (AC) electrical power output. An energy storage system (ESS) provides an ESS direct current (DC) electrical power output. A first inverter is connected to the generator for receiving the generator AC electrical power output and for providing a DC power output. A second inverter is connected to the first inverter and the ESS for receiving the DC power output from the first inverter and the ESS DC electrical power output for providing an AC power output. A first power mode includes the generator maintaining a first generator power output level corresponding to a specified power requirement of a load source, and the ESS providing an additional first ESS power output level for satisfying the specified power requirement of the load source.

17 Claims, 2 Drawing Sheets

(51) Int. Cl.
*H02J 4/00* (2006.01)
*H02J 9/06* (2006.01)
*H02J 9/08* (2006.01)
*H02K 7/18* (2006.01)

(52) U.S. Cl.
CPC .............. *H02J 9/08* (2013.01); *H02K 7/1815* (2013.01); *Y02B 10/72* (2013.01); *Y10T 307/516* (2015.04); *Y10T 307/615* (2015.04)

(58) Field of Classification Search
USPC ..................................................... 307/64, 65
See application file for complete search history.

(56) References Cited

U.S. PATENT DOCUMENTS

| | | | |
|---|---|---|---|
| 5,563,802 A | 10/1996 | Plahn et al. | |
| 5,714,851 A | 2/1998 | Antony et al. | |
| 6,230,496 B1 | 5/2001 | Hofmann et al. | |
| 6,326,702 B1 | 12/2001 | Yonekura et al. | |
| 6,383,106 B1 | 5/2002 | Kashiwase | |
| 6,670,788 B2 | 12/2003 | Prabhu et al. | |
| 6,737,762 B2 | 5/2004 | Koenig | |
| 7,078,877 B2 | 7/2006 | Salasoo et al. | |
| 7,325,097 B1 | 1/2008 | Darcy | |
| 7,587,475 B2 | 9/2009 | Koneru | |
| 7,595,597 B2 | 9/2009 | King et al. | |
| 7,800,247 B2 | 9/2010 | Chang et al. | |
| 8,994,214 B2 * | 3/2015 | Apalenek ................... | H02J 7/35 307/64 |
| 2003/0080622 A1 | 5/2003 | Koenig | |
| 2004/0178773 A1 | 9/2004 | Eguchi et al. | |
| 2005/0138557 A1 | 6/2005 | Bolder et al. | |
| 2005/0188939 A1 | 9/2005 | Iwatsuki et al. | |
| 2007/0029799 A1 | 2/2007 | Shimizu et al. | |
| 2008/0121448 A1 | 5/2008 | Betz et al. | |
| 2008/0263183 A1 | 10/2008 | Nishiyama et al. | |
| 2009/0166113 A1 | 7/2009 | Luo et al. | |
| 2011/0080040 A1 | 4/2011 | Kumar | |
| 2011/0298288 A1 | 12/2011 | Cho et al. | |
| 2012/0033139 A1 | 2/2012 | Guo et al. | |

FOREIGN PATENT DOCUMENTS

| | | |
|---|---|---|
| JP | H089319 A | 4/1996 |
| JP | 2004-166495 | 6/2004 |
| JP | 2005-083195 A | 3/2005 |
| JP | 2010-98888 | 4/2010 |
| JP | 2010-104226 | 5/2010 |

OTHER PUBLICATIONS

United Kingdom Patents Act 1977: Examination Report under Section 18(3) dated Oct. 10, 2013 received in related application GB 1214287.3.
Spanish Written Opinion dated Mar. 24, 2014 received in application 201231144.
Search Report dated Jun. 26, 2013 received in related application GB 1214287.3.
Combined Search and Examination Report dated Dec. 4, 2012 received in related case GB1214287.
Notice of Allowance dated Nov. 20, 2014 issued in U.S. Appl. No. 13/206,083.
Notice of Allowance dated Sep. 5, 2014 issued in U.S. Appl. No. 13/206,083.
U.S. Final Office Action dated Jun. 18, 2014 issued in U.S. Appl. No. 13/206,083.
U.S. Office Action dated Feb. 26, 2014 issued in U.S. Appl. No. 13/206,083.
Chinese Office Action dated Jul. 15, 2015 issued in corresponding Chinese Patent Application No. 201210280074.6.

* cited by examiner

US 9,705,357 B2

HYBRID ELECTRIC GENERATOR SET

CROSS-REFERENCE TO RELATED APPLICATION

The present application is a continuation application of U.S. Ser. No. 13/206,083, filed Aug. 9, 2011, the entire contents of which are incorporated herein by reference

FIELD OF THE INVENTION

The present invention generally relates to electronic generator sets, and more specifically, to a portable generator system including an electronic generator set having an engine and a generator.

BACKGROUND OF THE INVENTION

Known are energy storage systems and portable (or auxiliary) power systems for general home use or, on a larger scale, for commercial buildings, for example, hospitals. Also, auxiliary power systems may be used to provide power for many types of equipment, such as lighting, sound systems, amusement park rides, on site machinery or tools, or mobile emergency systems. The power system may include an engine and generator combination (also referred to as a generator set), which may include a diesel or gasoline engine driving a generator which produces a voltage output.

Other power systems may include the use of photovoltaics used directly as a power source, and which may also be fed back to a local power grid, for example, a utility grid. Another power system may include a diesel generator set, or engine generator set. The generator provides alternating current (AC) power to a junction box or bus bar to power a load source. Such systems require running the engine at a constant engine speed using a regulator or governor, and a generator voltage regulator. The system typically requires a transfer switch to disconnect the load from the utility power source, and connect the generator to the load when there is a power failure. Further, typically generators require the engine to run at a predetermined speed to provide power at the proper frequency. When the engine is not running at optimum speed for a given load, the engine may have very poor efficiency.

For example, typical synchronous generator sets must operate the engine at a fixed speed (typically 1800 or 3600 (revolutions per minute) RPM) in order to produce a required 60 Hz frequency output voltage. When there is low output load, or no output load, a large portion of fuel consumption is required to maintain a moderate to high engine speed and thus makes the system very inefficient. Additionally, another shortcoming of known generator sets occurs when the power system experiences a large instantaneous load such as from a large motor or heating element, the engine cannot respond instantly, resulting in a momentary droop in frequency and possibly also in voltage, depending on the voltage regulation system.

Therefore, a need exists for a system and method for providing power in a portable electrical generator set which is more efficient than existing systems.

SUMMARY OF THE INVENTION

In an aspect of the invention, a portable generator system for providing power to a load source includes an engine and a generator. The engine drives the generator to provide a generator alternating current (AC) electrical power output. An energy storage system (ESS) provides an ESS direct current (DC) electrical power output. A first inverter is connected to the generator for receiving the generator AC electrical power output and for providing a DC power output. A second inverter is connected to the first inverter and the ESS for receiving the DC power output from the first inverter and the ESS DC electrical power output for providing an AC power output. A first power mode includes the generator maintaining a first generator power output level corresponding to a specified power requirement of a load source, and the ESS provides an additional first ESS power output level for satisfying the specified power requirement of the load source.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
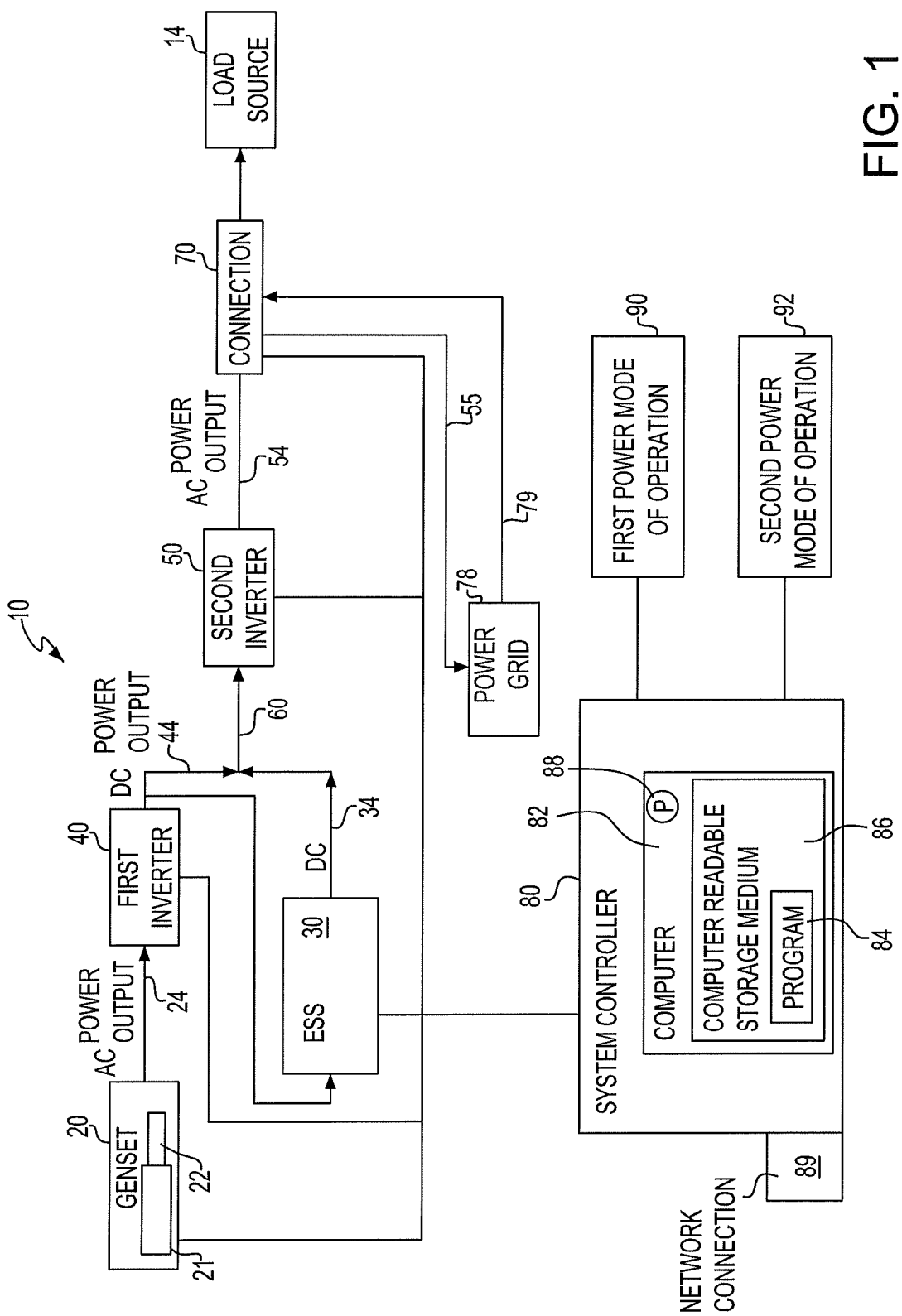
FIG. 1 is a schematic block diagram of a generator system according to an embodiment of the invention.

Referring to FIG. 1, in an embodiment of the invention, a portable generator system 10 provides power to a load source 14. The system 10 includes a generator set 20 which includes a motor or engine 21, for example a diesel engine, which powers a generator 22 to provide an alternating current (AC) electrical power output 24 from the generator 22. For example, the generator 22 may be a permanent magnet generator. An energy storage system (ESS) 30 provides a direct current (DC) electrical power output 34 from the ESS 30. The ESS may include lithium ion batteries. A first inverter 40 is connected to the generator 22 for receiving the AC electrical power output 24, and provides a DC power output 44. The DC power output 44 from the first inverter may also recharge the ESS. Thereby, the generator system may be considered a hybrid electric generator. The ESS may also alternatively include ultra-capacitors, lead-acid batteries, and other energy storage mediums. The ultra-capacitor may include an electric double-layer capacitor (EDLC), also known as a, supercapacitor, supercondenser, or an electrochemical double layer capacitor, which has an electrochemical capacitor with relatively high energy density.

A second inverter 50 is connected to the ESS 30 and the generator 22 via a common electrical bus 60 which receives the DC power outputs 44, 34 from the first inverter 40 and the ESS 30, and provides a combined AC power output 54. The system 10 may be operated in several modes of operation. A first power mode 90 includes the generator 22 maintaining a first generator power output level corresponding to a specified power requirement of the load source 14. Alternatively, the engine is capable of ramping to a second generator power output level corresponding to a second specified power requirement of the load source. Further, the ESS 30 provides an additional first ESS power output level for the specified power requirement of the load source 14.

The DC power output 44 can be used to recharge the ESS as needed, under normal operation of the generator set 20.

In one example, the system 10 includes the generator set 20 providing all power requirements for the load source 14, while the ESS 30 is not needed to provide power to the load 14. However, the ESS 30 is ready to provide additional power should a transient power requirement, or a higher power requirement be necessitated by the load source 14. Thereby, the system 10 combines a variable speed generator set 20 with an ESS 30 to maximize engine efficiency while maintaining power quality. The first inverter 40 can also be referred to as a generator inverter because its function is the convert AC to DC for the generator, and the second inverter 50 can also be referred to as a grid inverter because the second inverter provides AC power equivalent to a grid power supply.

The system may include a system controller 80 including a computer 82 having a computer program 84 stored on a non-transient computer readable medium 86, the computer 82 including a processor 88 for executing steps of the computer program 84. The system controller 80 may also include a network connection 89 for communicating with a network or the Internet. The system controller 80 is capable of managing the combined power output 54 of the generator 22 and the ESS 30 including selectively initiating a plurality of power modes. Thus, the system controller 80 provides overall supervisory control of the system 10, any user interface functions, and enables the system 10 to provide power modes.

In another embodiment of the invention, a second power mode 92 includes shutting the engine and the generator off. The second power mode 92 is implemented when the load requirements are capable of being provided solely by the ESS 30, and running the generator set 20 would require the engine to be run inefficiently at any speed. Thus, the system controller 80 can implement the second power mode 92 when the engine is below a specific efficiency, and/or the generator is required to meet a predetermined low power output. The ESS maintains a specified ESS power output level corresponding to the specified power requirement of the load source. The engine and generator can be switched back on when a predetermined ESS discharge level is reached, such that the generator provides a power output to recharge the ESS.

Thereby, at very low load conditions, when engine efficiency is poor, for example, at idle speed, the system 10 can shut the engine down entirely and provide output power exclusively from the ESS 30. When the ESS 30 reaches a predetermined discharge level the system automatically restarts the engine 21 and operates the engine 21 at an efficient load point by powering the load and charging the ESS 30 simultaneously. One benefit of the system 10 is reduced engine maintenance, which results from three factors. First, engine RPM is reduced over a wide range of load conditions and therefore total engine revolutions over a given operating interval are reduced. In the second power mode 92, engine operation is eliminated under certain load conditions, further reducing engine wear. In both power modes 90, 92, the engine is insulated from high stress transient conditions by the ESS. An optimal range of RPM for the engine can be ascertained from the manufacturer of the engine. Using the present system 10, the engine can be maintained in the optimal RPM range because the ESS is used to provide power during load spikes, and the engine can be shut off at times of low power requirements, thereby the system maintains a greater proportion of time with the engine in the optimal RPM range, raising the overall efficiency of the system 10.

In both the first and second power modes, the ESS 30 is capable of responding to a transient power request (or spikes in requested power) caused by the load source 14. The engine is capable of ramping to a second generator power output level corresponding to a second specified power requirement of the load source. This enables the engine to slowly or gradually ramp up, i.e., increase its speed (RPM) to handle the new load. This is an advantage over known systems for diesel engines, as diesel engines are inefficient in a transient phase under load. Thus, by enabling the diesel engine to transition slowly, the present system 10 allows the engine to maintain higher efficiency.

The system 10 may be incorporated in a trademarked system named HybriGen™. One advantage of the system 10 is that the system generates the output voltage and frequency electronically using a second inverter 50, which allows the system 10 to operate the engine 21 at a selected speed which is most efficient for the present load. The first inverter 40 connected to the generator 22, allows the system 10 to maintain adequate DC voltage regardless of the engine 21 speed. The system 10 provides highly stable voltage and frequency regulation wherein the engine speed can be varied, and in one example, operating in idle, or shut off completely as in the second power mode 92.

The system's 10 integration of the battery ESS 30 (which could also be ultra-capacitor based) allows the system 10 to maintain high quality voltage and frequency regulation even when exposed to high transient loads. The ESS 30 can immediately respond to large instantaneous loads to maintain voltage and frequency regulation at the output. The engine 21 can then be gradually ramped to the new load level while the ESS maintains the output. This further enhances efficiency since diesel and other internal combustion engines exhibit very poor efficiency during high transient conditions.

In known back up generator systems for providing power during a power failure of grid power 79 to a load 14 being provided by a power grid 78, the generator is started, brought up to a specified speed, and the house, building, or, for example, hospital is disconnected from the grid, and the generator is connected to the house, etc. Typically, there is a circuit in the generator to keep the voltage at the right level, for example, 115 volts. There is also a throttle control that keeps the engine running, staying at the right speed to maintain a frequency of 60 Hz. For example, a diesel engine may run at about 360 rpm in order to maintain a 60 Hz frequency, and may be rated for about 100,000 watts of power. However, the load power requirements may only require using about 10,000 watts from the generator, which results is poor fuel efficiency as the generator does not operate at optimum levels, i.e., using only a fraction of its capability.

In the present system 10, the engine 21 can be throttled down to a slower RPM so that the generator 22 is providing a power output proportional to the power requirements of the load. The system 10 uses the first inverter 40 to generate a DC output and supply the voltage to the ESS 30. The second inverter 50 provides the output power level and frequency required by the load. Further, if the load suddenly changes, the ESS provides supplemental power in addition to the generator until the engine (e.g., diesel engine) can ramp up to a new speed (RPM), and thereby increased power output from the generator. Thereby, the system 10 can run the engine at an optimum speed for providing the required voltage output.

In the second power mode, the engine is off and the system power output is solely from the ESS. Thus, the system 10 runs the engine at a speed (RPM) necessary for the required power output, or the engine is off, thereby raising the efficiency of the overall system 10. The second inverter is able to take the generator down to a low speed. For example, if the load requires 30 kilowatts power form the system 10, the speed of the engine is lowered so that the generator provides 30 kilowatts of power, the first inverter 40 takes the AC power output (output voltage) and boost it up to the DC voltage level of the battery. Then the second inverter 50 takes that DC output level from the first inverter 40 and the ESS 30 and converts this into the AC power output which is regulated for voltage and frequency. Thereby, the system 10 allows the engine to run at speeds required for needed power generation, thus requiring less fuel for the engine.

More specifically the generator 22 may be a permanent magnet generator, wherein its voltage is proportional to the speed of the engine, and the energy output is proportional to the RPM of the engine. The AC output 24 of the generator 22 is always less than the minimal voltage of the ESS 30 (or battery pack), as constrained by design of generator and rechargeable battery systems. In the system 10, the first inverter receives the AC output 24 and converts it to a DC output 44 which equals the ESS (battery) voltage. The second inverter 50 provides an AC output 54 as needed to the load source 14, while the first inverter 40 provides power to charge the ESS. Further, the first inverter 40 can provide all or part of its received AC power 24 to the ESS 30, while providing any excess AC power 24 from the generator 22 to the second inverter 50 via DC power output 44. In an alternative embodiment of the invention, the second inverter provides an AC output 54 as needed to the load source 14, and provides AC power 55 to a power grid 78 via a connection point 70 between the second inverter 50 and the load source 14.

Figure 2:
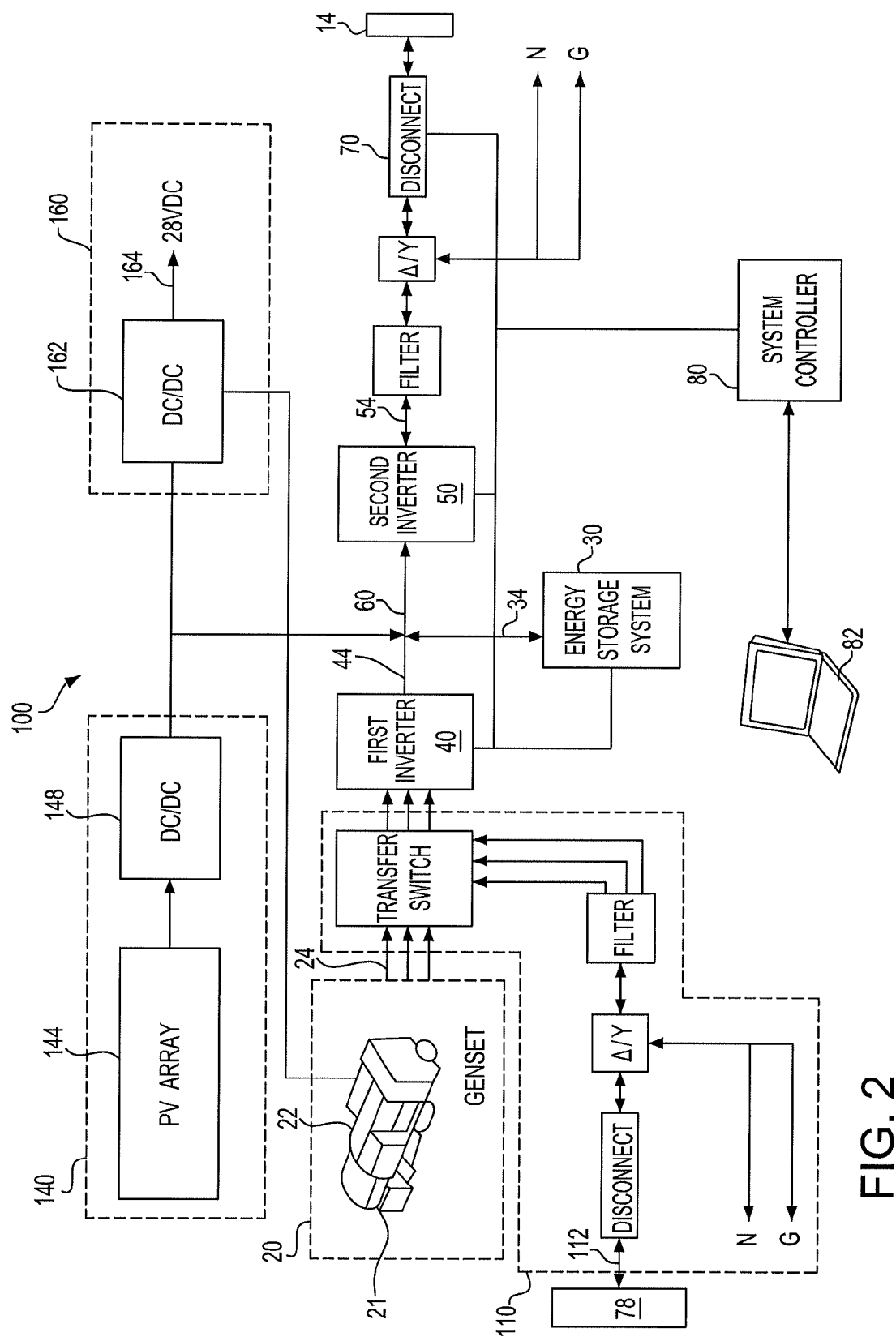
FIG. 2 is schematic block diagram of the generator system shown in FIG. 1, further including additional components.

Referring to FIG. 2, wherein the same elements of FIG. 1 have identical reference numerals, an alternative embodiment according to the invention includes optional components of a system 100 which are enclosed by dotted lines in component groups. Component group 110 allows the first inverter 40 to operate from the power grid 78 (e.g., utility grid) using a grid connection 112. The power grid 78 may include a locally produced grid, such as a remote facility with multiple generators, or an AC source generated by other source, such as a local utility. In the system 100 of FIG. 2, the grid connection 112 can selectively substitute for the generator set 20, wherein the system 100 can provide all the features described previously for the system 10 using the engine/generator 20. If power from the grid 78 is interrupted, the system 100 automatically switches from the grid connection 112, to the engine/generator 20, and starts the engine 21. During the period of time required for the transfer, the ESS 30 provides the load power requirements so there is no disruption of power to the load 14.

Component group 140 includes a photovoltaic (PV array) input 144, and a DC/DC converter 148 which can be used to add supplemental solar power to the common DC bus 60. The solar power can be used to charge the ESS 30 and/or partially or completely meet the power requirements of the AC load 14. Component group 160 includes an optional DC/DC converter 162 providing 28V DC power output 164.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A portable generator system for providing power to a load source, comprising:
   an engine and a generator, wherein the engine drives the generator to provide a generator alternating current (AC) electrical power output;
   an energy storage system (ESS) to provide an ESS direct current (DC) electrical power output;
   a first inverter connected to the generator for receiving the generator AC electrical power output and for providing a DC power output; and
   a second inverter receiving the DC power output from the first inverter and the ESS for providing an AC power output;
   wherein a first power mode includes the generator maintaining a first generator power output level corresponding to a specified power requirement of a load source, and the ESS providing an additional first power output level to satisfy the specified power requirement of the load source.

2. The system of claim 1, wherein the ESS is capable of responding to a transient power request by the load source.

3. The system of claim 1, wherein the engine is capable of ramping to a second generator power output level corresponding to a second specified power requirement of the load source.

4. The system of claim 1, wherein the DC power output from the first inverter recharges the ESS.

5. The system of claim 1, further comprising:
   a second power mode includes the engine and the generator being shut off at a specified generator power output level and/or at a specified RPM of the engine, while the ESS maintains a specified ESS power output level corresponding to a specified power requirement of the load source, and the engine and generator being switched on when a predetermined ESS discharge level is reached such that the generator provides a power output to recharge the ESS.

6. The system of claim 1, wherein the ESS includes lithium ion batteries, ultra-capacitors, or lead acid batteries.

7. The system of claim 1, further comprising:
   a system controller including a computer having a computer program stored on a non-transient computer readable medium, the computer including a processor for executing steps of the computer program, the system controller being capable of managing a combined power output from the generator and the ESS including selectively initiating a plurality of power modes using the computer program.

8. The system of claim 1, wherein the first power mode includes the engine having a first engine RPM within an optimal engine RPM range for maintaining a first engine power output level.

9. A method for providing power to a load source, comprising:
   generating an alternating current (AC) electrical power output from an engine and a generator;
   generating a direct current (DC) electrical power output using an energy storage system (ESS);

receiving the generator AC electrical power output and providing a DC power output using a first inverter connected to the generator;

receiving the DC power output from the first inverter and the ESS for providing an AC power output using a second inverter; and maintaining a first generator power output level corresponding to a specified power requirement of a load source, and the ESS providing an additional first power output level to satisfy the specified power requirement of the load source, in a first power mode.

10. The method of claim 9, further comprising:
responding to a transient power request by the load source using the ESS.

11. The method of claim 9, further comprising:
ramping to a second generator power output level of the engine corresponding to a second specified power requirement of the load source.

12. The method of claim 9, further comprising:
recharging the ESS using the DC power output from the first inverter.

13. The method of claim 9, further comprising:
transitioning the engine and the generator to shut off at a specified generator power output level and/or at a specified RPM of the engine in a second power mode, while the ESS maintaining a specified ESS power output level corresponding to a specified power requirement of the load source; and transitioning the engine and generator to power on when a predetermined ESS discharge level is reached such that the generator provides a power output to recharge the ESS.

14. The method of claim 9, further comprising:
managing a combined power output from the generator and the ESS including selectively initiating a plurality of power modes using a computer program being included in a system controller which includes a computer having a computer program stored on a non-transient computer readable medium, the computer including a processor for executing steps of the computer program.

15. The method of claim 9, further comprising:
maintaining a first engine RPM within an optimal engine RPM range for maintaining a first engine power output level.

16. A generator system for providing power to a load source, comprising:

an engine and a generator, wherein the engine operates within its optimum performance range to drive the generator to provide a generator alternating current (A.C.) electrical power output required by the load source;

an energy storage system (ESS) to provide an ESS direct current (D.C.) electrical power output; and an inverter for converting the D.C. electrical power output to an additional A.C. electrical power output;

wherein the additional A.C. power output supplements or replaces the generator A.C. power output when the load source would otherwise require the engine to operate outside its optimum performance range.

17. A generator system according to claim 16, wherein the energy from the generator A.C. power output is used to recharge the ESS if the ESS is discharged below a predetermined level.

* * * * *